United States Patent
Beckwith et al.

[11] 3,728,753
[45] Apr. 24, 1973

[54] DOCKBOARD

[75] Inventors: Robert C. Beckwith, Scotts Bluff, Nebr.; Robert W. Hecker, Jr., Clare, Mich.

[73] Assignee: Rite-Hite Corporation, Milwaukee, Wis.

[22] Filed: Mar. 3, 1971

[21] Appl. No.: 120,520

[52] U.S. Cl....................................................14/71
[51] Int. Cl...............................................B65g 11/00
[58] Field of Search............................................14/71

[56] References Cited

UNITED STATES PATENTS

| | | | |
|---|---|---|---|
| 3,137,017 | 6/1964 | Pfleger | 14/71 |
| 3,327,335 | 6/1967 | Beckwith et al. | 14/71 |
| 3,444,574 | 5/1969 | LeClear | 14/71 |
| 3,500,486 | 3/1970 | LeClear | 14/71 |

*Primary Examiner*—Nile O. Byers, Jr.
*Attorney*—McGlynn & Reising, Milton & Ethington

[57] ABSTRACT

A dockboard assembly including a support structure with a ramp having a first end pivotally connected to the support structure for pivotal movement between raised and lowered positions on opposite sides of the dock level position. A lip is pivotally connected at a rear edge to the front of the ramp for pivotal movement between an extended cantilevered position and a pendent position. The support structure includes lip supporting keepers for receiving the front edge of the lip when the lip is in the pendent position for supporting the ramp in the dock level position. Safety legs are pivotally connected to the ramp for engaging one of two vertically spaced abutment surfaces for limiting downward pivotal movement of the ramp. The improvement resides in actuation means for pivoting the lip upwardly from the pendent position as the ramp is pivoted upwardly slightly to allow the front edge of the lip to move downwardly past the lip support keepers and for pivoting the safety legs to a retracted position whereby they will not engage the abutment surfaces so that the ramp may be pivoted to a lowered position.

10 Claims, 2 Drawing Figures

Patented April 24, 1973
3,728,753
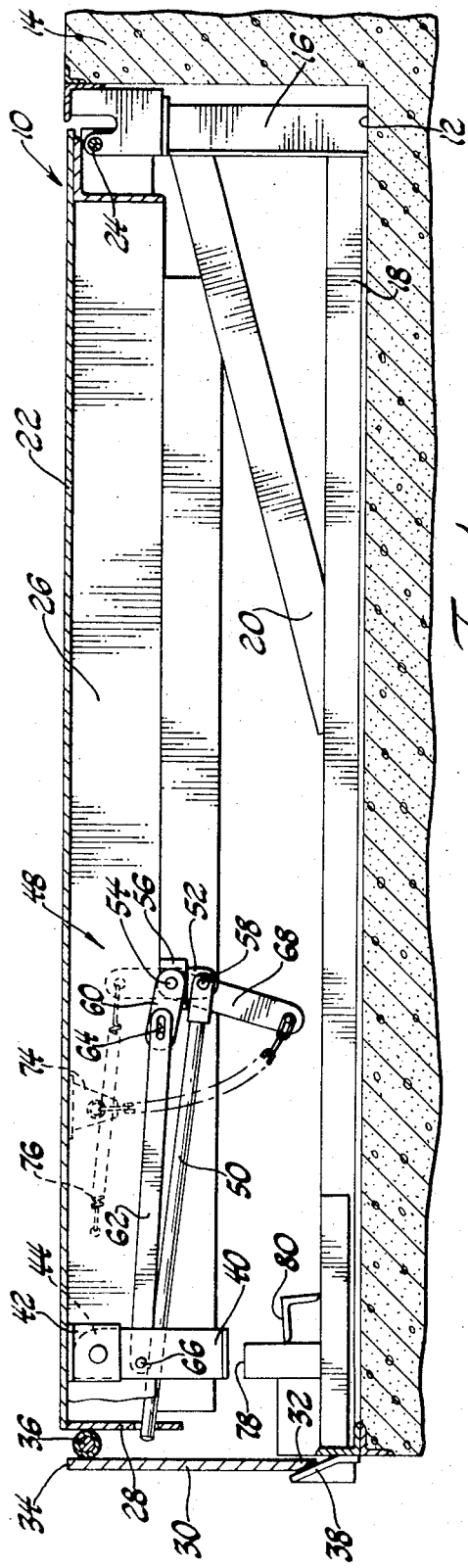
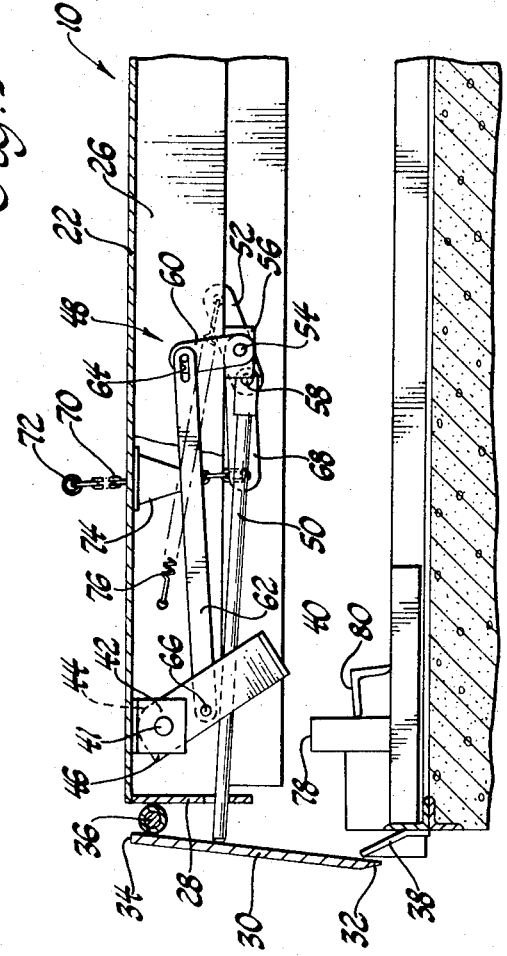
INVENTORS
Robert W. Hecker, Jr. &
BY Robert C. Beckwith
Barnard, McGlynn & Reising
ATTORNEYS

DOCKBOARD

Dockboard assemblies of the type to which the instant invention pertains include a support means with a ramp pivotally connected to the support means at a rear end and a lip pivotally connected to the front end of the ramp to form an extension thereof and to rest upon the bed of a vehicle adjacent a dock to facilitate the movement of traffic between the dock and the adjacent vehicle. Very frequently these dockboard assemblies are disposed in a pit in a concrete dock with the rear or pivoted end of the ramp adjacent the upper surface of the dock.

In one such dockboard assembly, means are provided for urging the ramp to pivot upwardly, such means taking the form of springs or torsion bars. A holddown mechanism is employed to prevent the ramp from pivoting upwardly in response to the biasing of springs or torque bars. There is also included linkage or an appropriate mechanism for moving the lip between a pendent position and an extended cantilevered position where the lip forms an extension of the ramp. Examples of such dockboard assemblies are shown in co-pending application Ser. No. 787,652 filed Dec. 30, 1968 and assigned to the Assignee of the instant invention and now U.S. Pat. No. 3,579,696 and application Ser. No. 114,264 filed Feb. 10, 1971 and assigned to the Assignee of the instant invention.

In using such a dockboard assembly, a truck, railroad car, or similar vehicle, to be loaded or unloaded, is positioned adjacent the dock and the holddown mechanism is released so that the ramp pivots upwardly and the lip is moved to the extended position. The ramp is then pivoted downwardly as by an operator walking onto the ramp so that the lip rests upon the adjacent vehicle, such as the bed of a truck, to facilitate the movement of traffic between the dock and the adjacent vehicle. The ramp is prevented from pivoting downwardly as traffic moves thereacross due to the fact that the lip is resting upon the bed of a truck. When the vehicle or truck moves away from the dock, however, the ramp is free to move downwardly in response to an appropriate weight disposed thereupon. In other words, should a vehicle move away from the dock so as to discontinue the support of the lip, an operator may walk upon or drive a forklift or similar vehicle upon such a ramp and the ramp will pivot downwardly until it engages the bottom of the pit. This situation, of course, is hazardous and can result in serious injury to dockworkers. This is particularly clear in a situation where the ramp is generally horizontal or flush with the adjacent dock when the lip is supported on an adjacent vehicle so that when the vehicle moves away from the dock a dockworker may assume that the ramp is supported in a cross traffic position flush with the top of the dock by the lip engaging the bottom of the pit, but where, in fact, the ramp is slightly below the upper level of the dock and not supported by the lip so that upon movement of traffic along the dock and across the ramp, the ramp pivots downwardly causing an accident.

A solution to this problem is set forth in U.S. Pat. No. 3,137,017 which discloses such a dockboard assembly including legs having notches therein attached to the ramp for engaging abutments at the bottom of the pit so that when the ramp is no longer supported by the lip resting upon an adjacent vehicle, the notches engage the abutments to prevent downward pivotal movement of the ramp an amount which would be dangerous. Another solution to this problem is set forth in U.S. Pat. No. 3,530,488 which discloses a plurality of plate-like rectangular members which are rotatably supported by the support means and are of different vertical heights so that downward movement of the ramp is limited at various different positions by positioning certain ones of the various different plate-like members to engage the ramp.

Such dockboard assemblies are very frequently installed in a pit in a loading dock and include means for engaging the distal or front end of the lip when in the pendent position to support the dockboard when in the dock level position with the upper surface of the ramp substantially co-planar with the upper surface of the dock. In this storage position, vehicles and other traffic may move along the dock and over the ramp. Such dockboards incorporate various linkage mechanisms for extending and locking the lip in the extended cantilevered position so that it will engage the bed of a truck, railroad car, or the like. Most of these actuating mechanisms are only operative when the ramp is pivoted a substantial distance above dock level. Furthermore, if the ramp were to be pivoted upwardly from the storage position but not to a position where the lip would be locked in the extended cantilevered position and thereafter pivoted downwardly, the lip would remain in the pendent position and would once again engage the lip support means to prevent the ramp from pivoting downwardly below dock level. To overcome this, the lip is manually grasped and pivoted outwardly as the ramp is pivoted downwardly below dock level.

To be able to move the ramp below dock level without the lip extended is important because frequently a vehicle such as a truck will be loaded right to the rear edge of the bed so that even if the lip were in the extended position there would be no room on the bed of the truck to support the lip. There is however no satisfactory dockboard including means to pivot the lip from the pendent position to allow the ramp to pivot below dock level and providing means to limit downward movement of the ramp when in the below dock level position.

Accordingly, it is an object and feature of this invention to provide such a dockboard assembly which includes safety leg means pivotally connected to the ramp and actuation means for pivoting the lip upwardly from the pendent position and for pivoting the safety legs to a position where the ramp may be moved to an extreme lowered position.

In correlation with the foregoing object and feature, it is another object and feature of this invention to provide such a dockboard assembly which includes a single manually graspable means for pivoting the lip outwardly and pivoting the safety legs to a retracted position.

In correlation with the foregoing objects and features, it is another object and feature of this invention to provide a dockboard assembly including safety legs pivotally connected to the ramp and abutment means providing a plurality of vertically spaced surfaces for engaging the safety leg means whereby the ramp may be supported or prevented from pivoting downwardly at a plurality of spaced positions.

Other objects and attendant advantages of the present invention will be readily appreciated as the same becomes better understood by reference to the following detailed description when considered in connection with the accompanying drawings wherein:

FIG. 1 is a fragmentary side view of a preferred embodiment of the dockboard of the instant invention with the ramp supported in the dock level position; and FIG. 2 is a fragmentary view similar to FIG. 1 but showing the lip pivoted outwardly and the safety leg means pivoted rearwardly to allow the ramp to be pivoted downwardly to the lowered position.

Referring now to the drawings, a preferred embodiment of a dockboard assembly constructed in accordance with the instant invention is generally shown at 10. The dockboard assembly 10 is shown disposed in a recess or pit 12 in a concrete dock 14.

The dockboard assembly 10 includes a support structure comprising the channel members 16, 18 and 20. Channel members 16, 18 and 20 are secured by an appropriate means to the concrete of the dock 14.

The dockboard assembly 10 includes a ramp 22 which is pivotally connected at 24 to the support structure for pivotal movement between a raised position above the dock level position and a lowered position below the dock level position. The ramp 22 includes channel members 26 and a downwardly depending flange 28.

The dockboard assembly 10 includes a lip 30 which has a front edge 32 and a rear edge 34. The lip 30 is pivotally connected through a piano-type hinge 36 adjacent the rear edge 34 to the ramp 22 for pivotal movement relative to the ramp between an extended cantilevered position (not shown) and a pendent position.

The support structure includes lip support means or keepers 38 for receiving the front edge 32 of the lip when the lip is in the pendent position for supporting the ramp in the dock level position, as illustrated in FIG. 1.

For the sake of simplicity and clarity, there is not illustrated lift means reacting between the support structure and the ramp to urge the ramp to pivot upwardly nor lip lifting and locking means for pivoting the lip 30 to the extended cantilevered position and locking the lip 30 in the extended cantilevered position. Examples of such means which may be utilized in the dockboard assembly of the instant invention are shown in the above mentioned co-pending applications.

The dockboard assembly 10 also includes safety leg means comprising a pair of safety legs 40 which are pivotally connected to the underside of the ramp 22 for movement between at least one position limiting downwardly pivotal movement of the ramp and a second or retracted position for allowing the ramp to pivot to the lowered position. The retracted position of the safety legs 40 is illustrated in FIG. 2. Preferably there are two safety leg members 40 disposed adjacent opposite sides of the ramp and pivotally connected to the ramp by brackets 42. The rear edge of each safety leg 40 is arcuate as indicated at 44 whereby the safety legs 40 are free to pivot rearwardly while they are prevented from pivoting forwardly past a position generally perpendicular to the ramp by the front portion 46 which engages the underside of the ramp 22.

There is also included actuation means generally indicated at 48 for pivoting the lip 30 upwardly from the pendent position to the position illustrated in FIG. 2 as the ramp pivots upwardly slightly from the dock level position to allow the front edge 32 of the lip to move downwardly past the lip support keepers 38 and for pivoting the safety legs 40 to the retractred position illustrated in FIG. 2 whereby the lip may be disengaged from the keepers 38 and the ramp 32 pivoted to a lowered position.

The actuation means 48 includes a rod 50 which is slidably supported adjacent its front end and adjacent the lip 30 by extending through an opening in the flange 28 of the ramp 22 so as to be abutable with the lip 30 when the lip 30 is in the pendent position. A first lever 52 is pivotally supported by the ramp 22 through the pin or shaft 54 which is rotatably supported in a bracket means 56. The rod 50 is pivoted at the second end thereof to the lower end of the first lever 52. A second lever 60 is pivotally connected or supported by the ramp 22 through the shaft 54 so as to be coaxial with the first lever 52. Both levers 52 and 60 are secured to the shaft 54 as by welding. A link 62 is pivotally connected through the lost motion connection 64 to the outer end of the second lever 60. The link 62 is pivotally connected at the other end by the pin 66 to the safety legs 40. The two safety legs 40 may be interconnected by the pin 66 or the link 62 may be connected by the pin 66 to one of the safety legs 40 as the safety legs 40 are interconnected by the shaft 41 which extends between and is welded to the two safety legs 40.

The first and second levers 52 and 60 are disposed at an angle relative to one another so that upon pivotal movement of the levers in unison, the rod 50 moves forwardly toward the lip 30 and the link 62 moves rearwardly. It will be noted that during this movement, because of the lost motion connection 64 the rod 50 moves forwardly before the link 62 moves rearwardly.

The actuation means also includes a third lever 68 which is also secured to the shaft 64 as by welding so as to be rotatably supported by the ramp coaxially with the first and second levers 52 and 60. A single manually graspable handle means comprising the chain 70 and ring 72 are operatively connected to the third lever 68 for pivoting the third lever 68 to pivot the first and second levers 52 and 60. The ring 72 is disposed in a cup 74 so as to be accessible from above the ramp 22.

A biasing means comprising the spring 76 interconnects one of the channels 26 of the ramp 22 and the upper end of the first lever 52 for urging the levers 52 and 60 to pivot to the retracted or non-use position illustrated in FIG. 1. The biasing action of the spring 76 therefore urges the safety legs 40 to the vertical position illustrated in FIG. 1.

The assembly also includes abutment means presenting vertically and horizontally spaced abutment surfaces 78 and 80. The abutment surfaces 78 and 80 engage the bottom of the safety legs 40 to limit downward pivotal movement of the ramp 22 at various vertically spaced positions. In other words, the abutment surfaces 78 and 80 are similar to steps.

The operation should be clear from the foregoing description but will be briefly summarized here. Normally the dockboard assembly is in the stored dock level position illustrated in FIG. 1. For use, the ramp 22 is raised by the lift means (not shown) upon manual actuation and the lip 30 is moved to and locked in the extended cantilevered position by lip lifting means (not shown). The ramp 22 is then lowered until the lip 30 engages the bed of an adjacent vehicle. If, however, it is desirous to end load or unload a vehicle adjacent the dock which is below dock level, the ring 72 may be pulled as the ramp 22 moves upwardly slightly above dock level so as to pivot the lip 30 outwardly to disengage the front edge 32 from the keeper 38 while at the same time pivoting the safety legs 40 to a retracted position whereby the ramp 22 may be lowered to a position below dock level. If it is desired to move the ramp but a slight distance below dock level, the safety legs 40 may not be pivoted so that they engage the abutment surface 78. If it is desired to move the ramp further below the dock level position, the safety legs 40 may be pivoted to a position where they engage the abutment surfaces 80. If, however, it is desired to move the ramp to the extreme lowered position, the safety legs 40 are pivoted to the retracted position as illustrated in FIG. 2.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A dockboard assembly comprising: a support structure, a ramp having first and second ends with the first end thereof being pivotally connected to said support structure for pivotal movement between a raised position above a dock level position and a lowered position below said dock level position, a lip having front and rear edges and being pivotally connected adjacent said rear edge to the second end of said ramp for pivotal movement relative thereto between an extended cantilevered position and a pendent position, said support structure including lip support means for receiving said front edge of said lip when said lip is in said pendent position for supporting said ramp in said dock level position, safety leg means pivotally connected to said ramp for movement between at least one position limiting downward pivotal movement of said ramp and a retracted position allowing said ramp to pivot to said lowered position, linkage actuation means for pivoting said lip upwardly slightly from said pendent position as said ramp pivots upwardly slightly to allow said front edge of said lip to move downwardly past said lip support means while immediately adjacent said pendent position and for pivoting said safety leg means to said retracted position whereby said lip may be disengaged from said support means and said ramp pivoted to said lowered position as said lip is in said pendent position and said safety leg means are in said retracted position.

2. An assembly as set forth in claim 1 wherein said actuation means includes a single manually graspable handle means.

3. An assembly as set forth in claim 1 including abutment means for engaging said safety leg means for limiting downward movement of said ramp.

4. An assembly as set forth in claim 3 wherein said abutment means presents vertically spaced surfaces for engaging said safety leg means to limit downward pivotal movement of said ramp at spaced positions.

5. An assembly as set forth in claim 1 wherein said actuation means includes a rod slidably supported adjacent a first end thereof and adjacent said lip with said first end thereof abutable with said lip when the latter is in said pendent position, a first lever pivotally supported by said ramp, said rod being pivotally connected at the second end thereof to said first lever, a second lever pivotally connected to said ramp coaxially with said first lever for movement therewith, a link pivotally connected to said second lever at one end and pivotally connected to said safety leg means at the other end, said first and second levers being disposed at an angle relative to one another so that pivotal movement of said levers in unison said rod moves forwardly and said link moves rearwardly.

6. An assembly as set forth in claim 5 wherein said actuation means further includes a third lever pivotally supported by said ramp coaxially with said first and second levers for movement therewith, a single manually graspable handle means accessible from above said ramp and operatively connected to said third lever for pivoting said levers.

7. An assembly as set forth in claim 6 including biasing means for urging said levers to pivot to a retracted position.

8. An assembly as set forth in claim 7 including abutment means for engaging said safety leg means for limiting downward movement of said ramp.

9. A dockboard assembly comprising: a support structure, a ramp having first and second ends with the first end thereof pivotally connected to said support structure for pivotal movement between a raised position above a dock level position and a lowered position below said dock level position, safety leg means pivotally connected to said ramp for movement between at least one position limiting downward pivotal movement of said ramp and a retracted position allowing said ramp to pivot to said lowered position, and abutment means presenting at least two stationary, vertically and horizontally spaced surfaces independent of said support-structure for engaging said safety leg means to limit downward pivotal movement of said ramp at spaced positions.

10. An assembly as set forth in claim 9 including manually actuatable means for pivoting said safety leg means to said retracted position to allow said ramp to pivot to said lowered position.

* * * * *